Feb. 23, 1954

W. L. PERRY 2,670,149

WINDING MACHINE

Filed Oct. 3, 1952

Inventor
Winthrop L. Perry
by Roberts, Cushman & Grover
Att'ys.

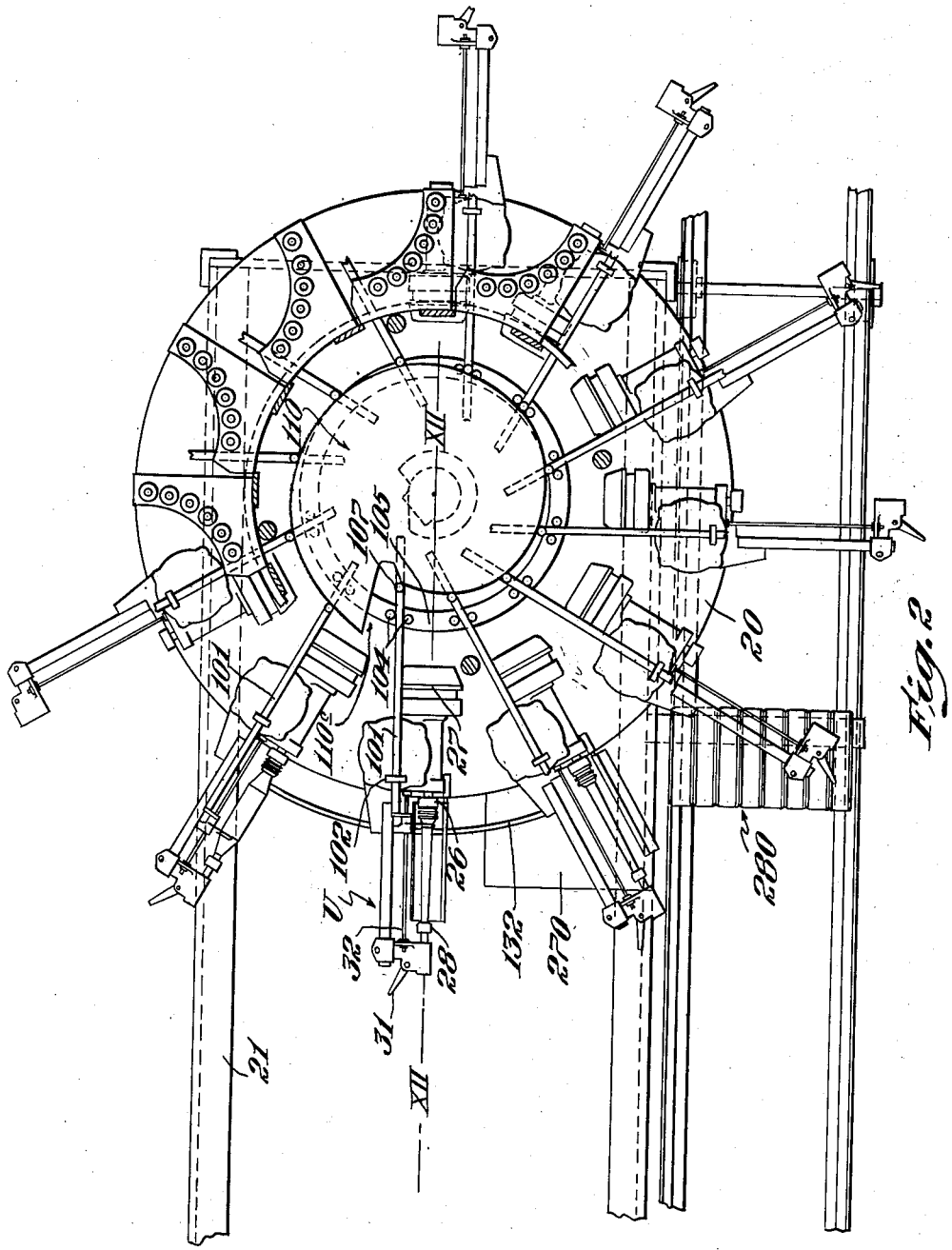

Feb. 23, 1954    W. L. PERRY    2,670,149
WINDING MACHINE
Filed Oct. 3, 1952
15 Sheets-Sheet 4

Inventor
Winthrop L. Perry
by Roberts, Cushman & Grover
Att'ys.

Feb. 23, 1954

W. L. PERRY 2,670,149

WINDING MACHINE

Filed Oct. 3, 1952

Inventor
Winthrop L. Perry
by Roberts, Cushman & Grover
Att'ys.

Feb. 23, 1954

W. L. PERRY 2,670,149

WINDING MACHINE

Filed Oct. 3, 1952

Inventor
Winthrop L. Perry
by Roberts, Cushman &
Grover
att'ys.

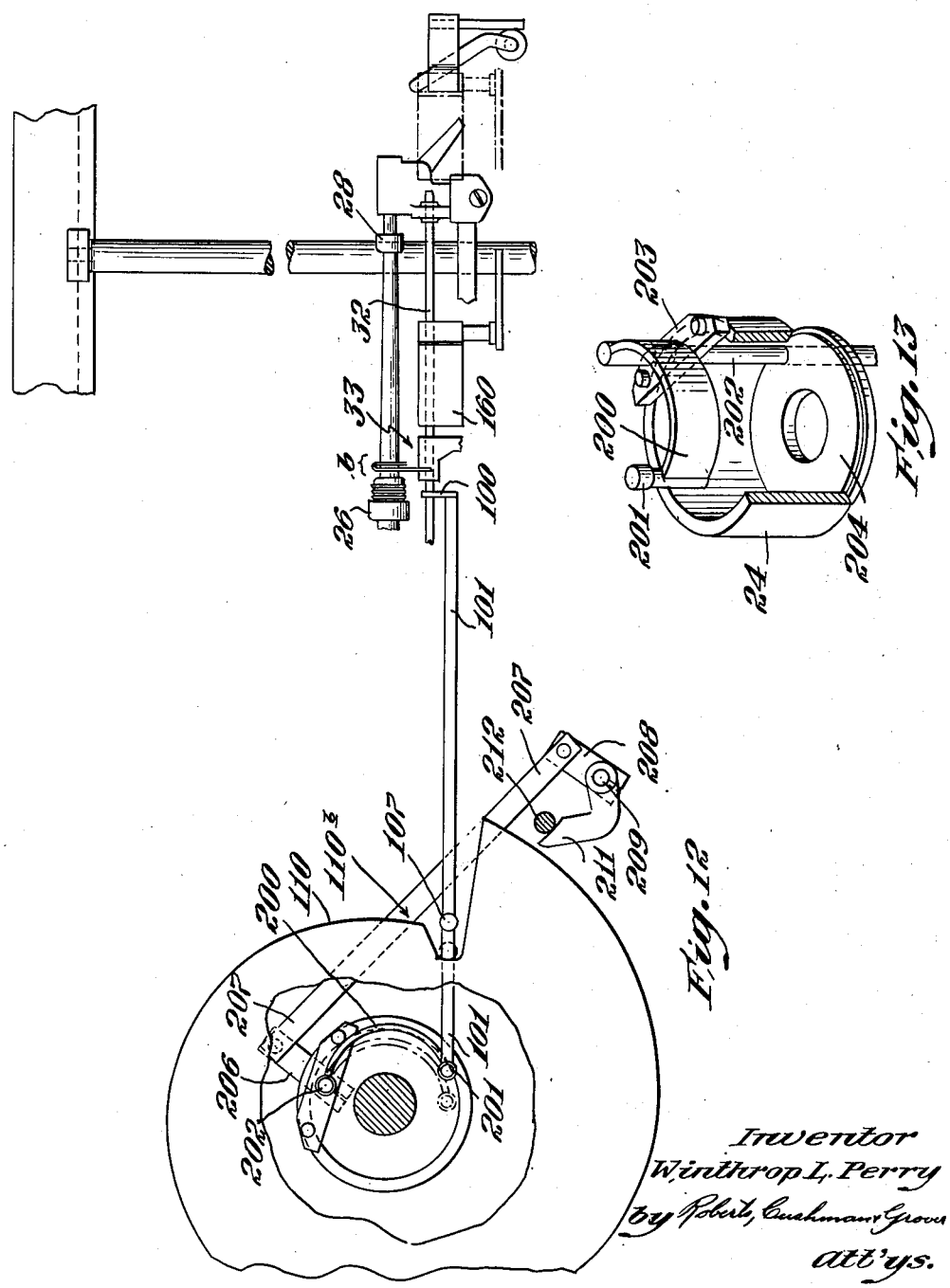

Inventor
Winthrop L. Perry
by Roberts, Cushman & Grover
att'ys.

Feb. 23, 1954    W. L. PERRY    2,670,149
WINDING MACHINE
Filed Oct. 3, 1952    15 Sheets-Sheet 14

Inventor
Winthrop L. Perry
by Roberts, Cushman & Grover
Att'ys.

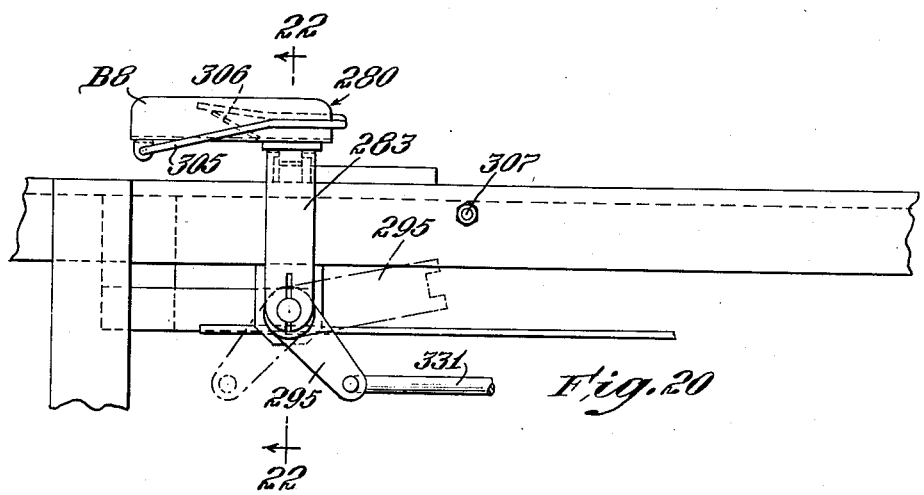
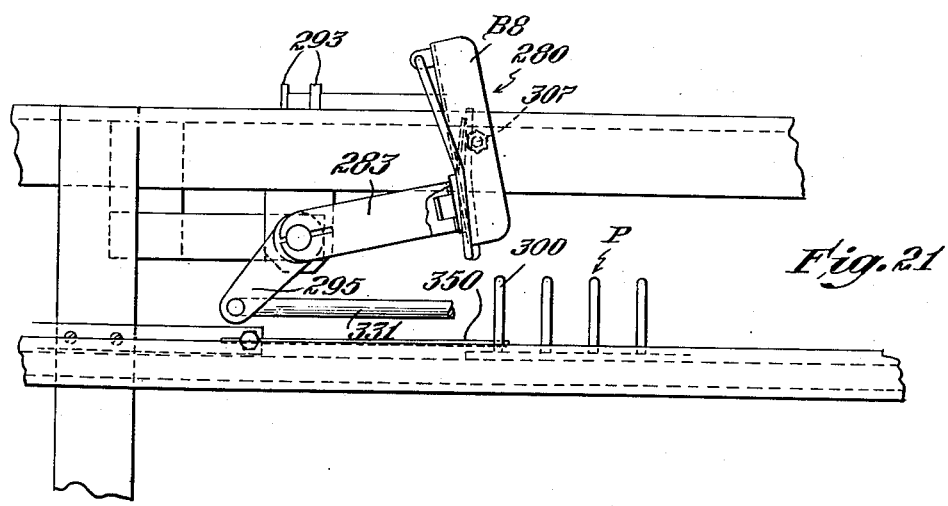
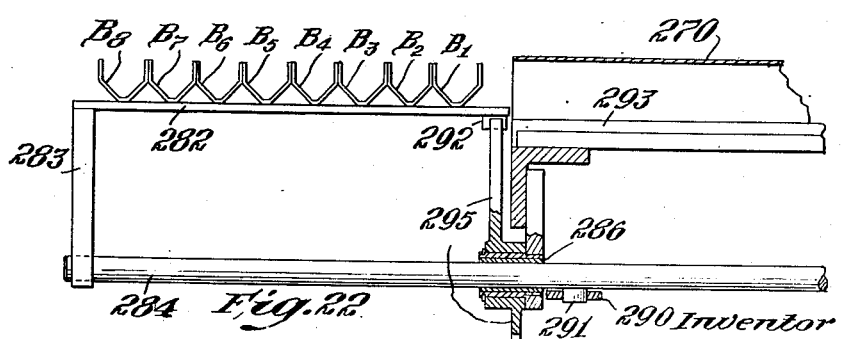

Patented Feb. 23, 1954

2,670,149

UNITED STATES PATENT OFFICE 2,670,149

WINDING MACHINE

Winthrop L. Perry, Milford, N. H., assignor to Abbott Machine Co., Inc., Wilton, N. H., a corporation of New Hampshire Application October 3, 1952, Serial No. 312,999

15 Claims. (Cl. 242—35.5)

This invention relates to winding machines which include a plurality of winding units of the type having a traversing thread guide having a zone of traverse adapted to progress during the winding, as in winding the typical filling bobbin for looms. More particularly the invention relates to machines of this type in which the winding units travel.

The invention aims to simplify the construction of such machines, improve their reliability, and make the timing and operation of their several automatic devices more certain. The invention further aims to reorganize machines of this type in such a way as to utilize a single cam for controlling the progression of the thread guides of the several units, to provide a rigid mounting for the several units, as upon a table, and to provide an intermittent rotary travel of the units in which the periods of stoppage of such travel are utilized in performing the automatic bobbin-changing and thread guide restoring operations. A further object is to simplify and improve the pinboard mechanism of such machines.

Traveling unit winding machines for winding filling bobbins, as customarily constructed, have a large number of winding units, for example one hundred. In these machines the doffing of the full bobbin, the return of the thread guide, the donning of a new supply bobbin and the cutting of the thread which extends to the full bobbin take place through a zone of travel of the units of substantial length. Thus, for example, four units out of the one hundred may occupy the zone where these operations are taking place, and hence necessarily be idle, that is, not winding. This is not prohibitive in a machine having a large number of units, but for a machine having a smaller number of units the proportion of idle units to active units would increase. An object of the invention is to provide a machine of this type, adapted for use with a respectively small number of units, i. e., suitable for small lots, in which the several operations mentioned above can take place at a single station, while the winding unit involved is stationary, so that the winding units are not necessarily rendered idle through any substantial distance of travel, or through an unduly long part of their travel, around the machine.

Other objects and advantages of the invention will be apparent from this specification and its accompanying drawings in which a preferred form of the invention is described and illustrated.

In the accompanying drawings:

Fig. 2 is a horizontal section taken on the line 2—2 of Fig. 1, showing the winding portion of the machine;

Fig. 9a is a detail view in side elevation of the bobbin depressor;

Fig. 12 is a diagram largely in plan showing the drive from the main cam shaft to the abutment returning arm, and showing the winding unit as carrying a new empty bobbin and the thread guide as confined between the thread guide abutment and the thread guide pusher in the narrow zone of the winding of a starting bunch;

Fig. 13 is a perspective diagrammatic view of the cam follower control lever;

Fig. 20 is a side elevation of the bobbin-collecting tray of a pinboard mechanism, in its bobbin-receiving position;

Fig. 21 is a side elevation of the bobbin-collecting tray tilted to discharge its group of bobbins onto a row of pins of a pinboard, these bobbins however being omitted;

Fig. 22 is a sectional view taken on the line 22—22 of Fig. 20.

Figure 1:
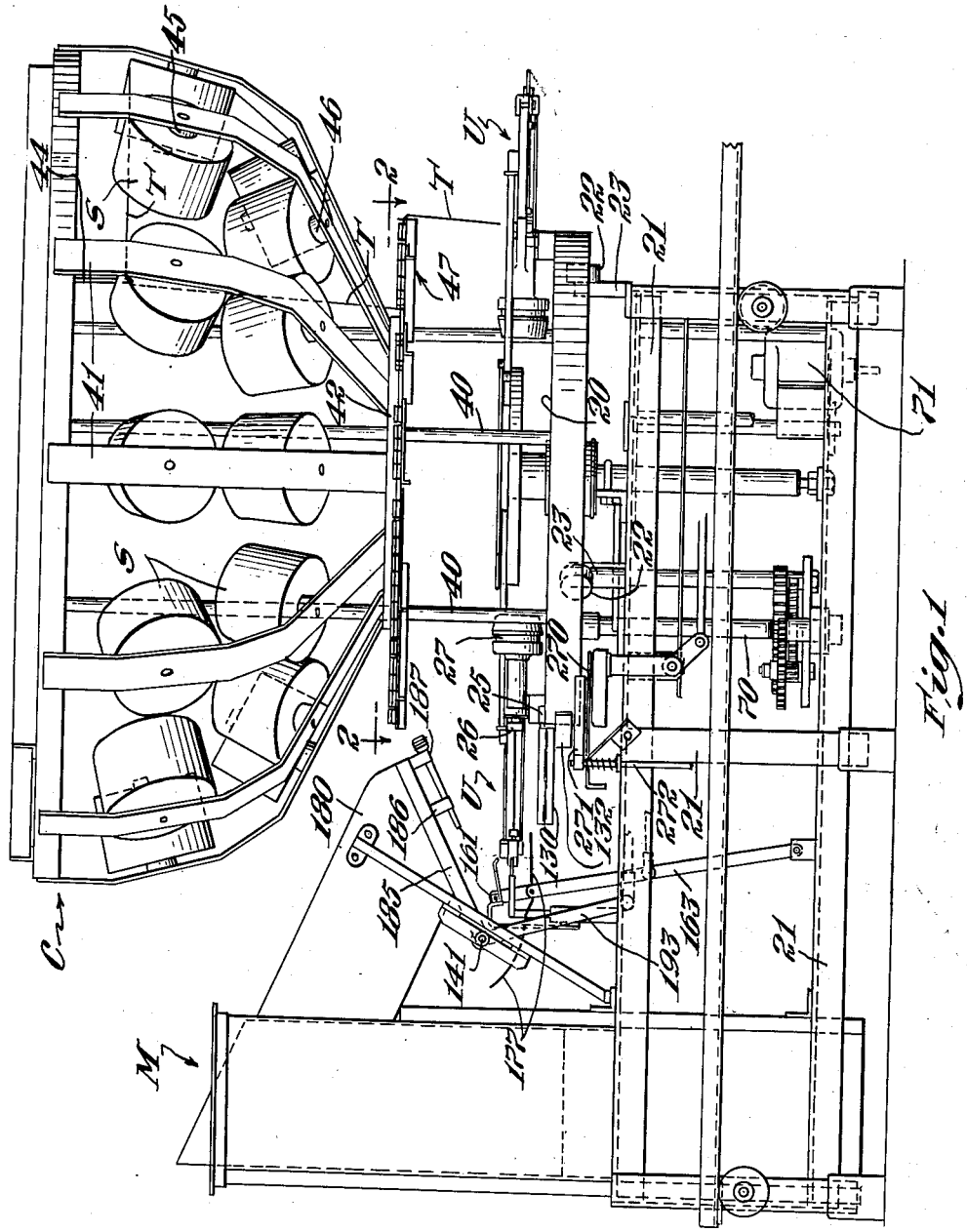
Fig. 1 is a side elevation of the machine, with numerous parts removed.
Figure 4:
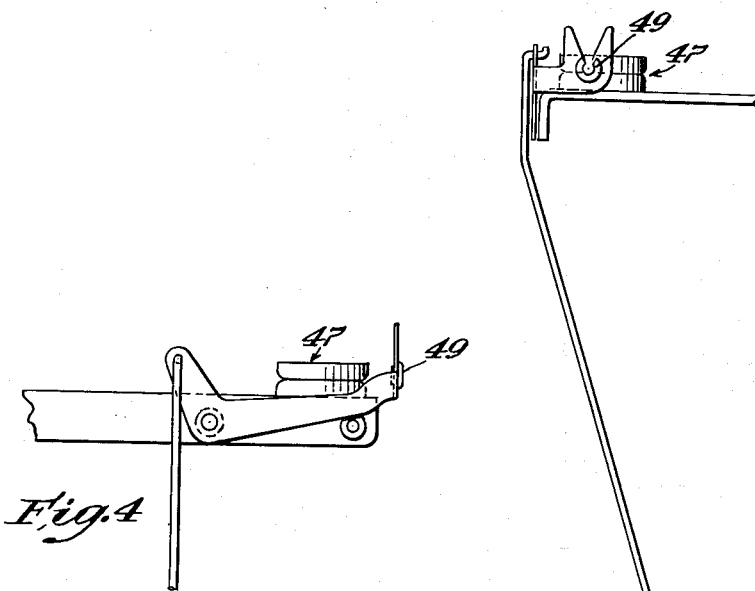
Fig. 4 is a fragmentary elevation taken at right angles to Fig. 3 showing the pivoted thread detector eye.
Figure 6:
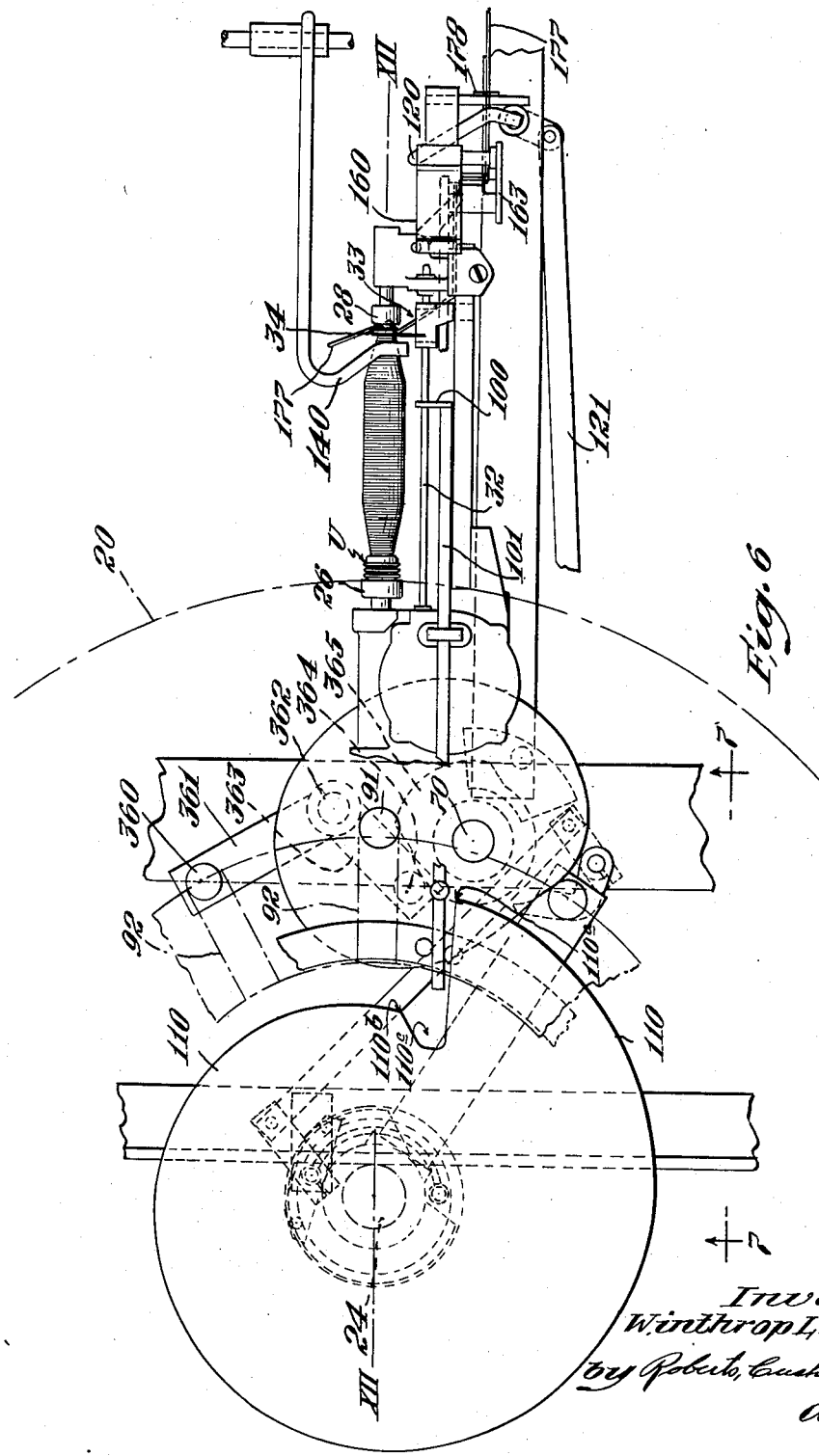
Fig. 6 is a diagrammatic plan view, with many parts omitted, showing one of the winding units, the main cam shaft, and showing diagrammatically the Geneva movement whereby the rotary table is unlocked, driven and locked by rotation of the main cam shaft.

The machine includes a rotatable table 20, Fig. 1, carrying a plurality such as twelve winding units U each radially arranged thereon. A suitable support for the table may include a frame indicated generally at 21 and three bearing rollers 22, two of which are shown in Fig. 1, carried by brackets 23 thereon, the lower surface of table 20 rolling upon these rollers. The table at its center fits loosely about a sleeve 24, Fig. 6, later referred to.

Figure 8:
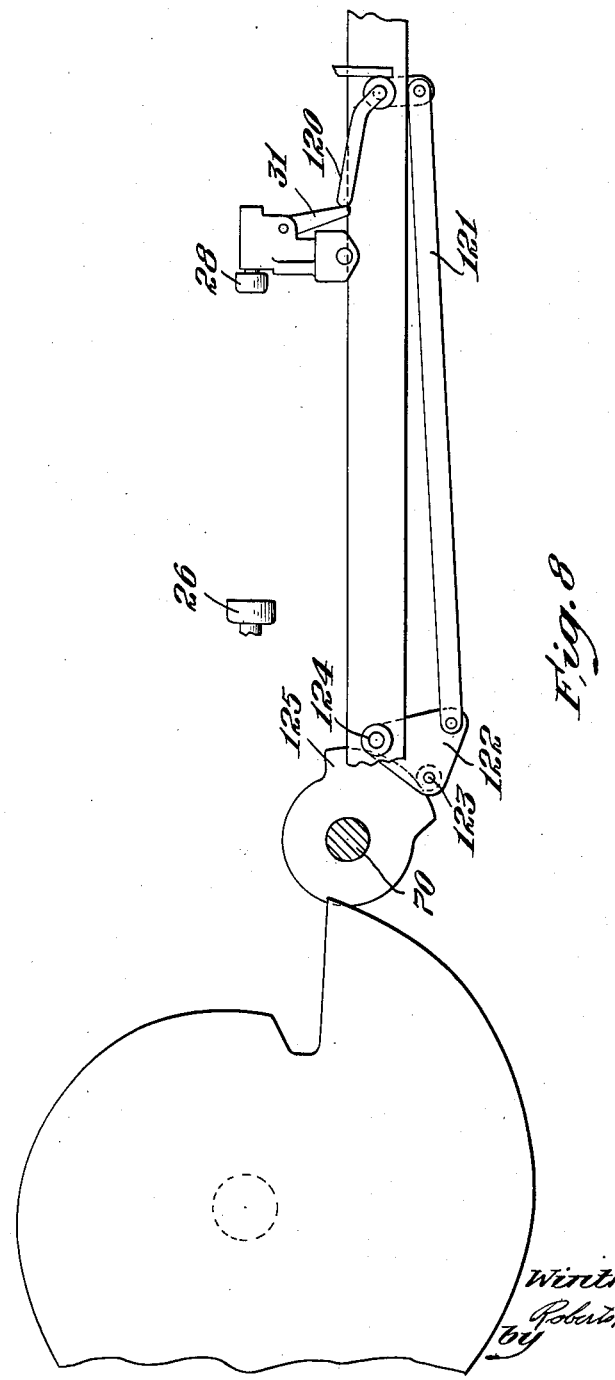
Fig. 8 is a diagrammatic view largely in plan showing the drive from the main cam shaft to the doffing lever.

Each winding unit U may be generally like the upper part of a traveling winding unit of United States Patent No. 2,352,455, being rigidly secured through brackets 25 to the table 20. Each unit thus includes an inner bobbin holding center or chuck 26 rotatable by an electric motor 27, an outer bobbin holding center or chuck 28 longitudinally retractible against spring pressure by a lever 31 (Fig. 8). A traverse rod 32 (Fig. 6) is reciprocable with a short stroke of traverse through a suitable cam as in United States Patent No. 2,377,367 driven by the motor 27.

A thread guide assembly 33, as in United States Patent No. 2,362,455, engages the traverse rod 32 frictionally, without being locked thereto, so that it tends to partake of the short stroke of traverse of the rod and so that it can be progressively displaced forwardly along the rod and can also be slid backwardly along the rod in preparation for reception of a fresh winding bobbin.

The thread guide is somewhat simplified from that of United States Patent No. 2,362,455 in having only a single thread eye in the form of a slot between parallel portions of a bent wire 34. The table is arranged for the thread to approach the thread guide eye from above, to pass therethrough, and continue down onto the winding bobbin.

A creel C (Fig. 1) for the supply packages is supported by vertical posts 40 upon the table 20. The creel includes twelve bent strips 41 extending upwardly and outwardly in a horizontal ring 42. Twelve guide eyes 44 extend down from the top of the creel. Each of the strips 41 serves as a support for an upper supply package holder 45 and a lower supply package holder 46, both directed toward one of the guide eyes 44. Supply packages S are "magazined" in the creel, with the leading end of thread of an active unwinding package extending to a winding unit and with the tail end of thread of this package connected to the end of thread of a reserve package.

The thread T extending from an eye 44 passes through any suitable tension device 47, here shown as a series of pairs of tension disks, thence through a detector eye 49, and thence to the thread guide of the corresponding winding unit.

Figure 3:
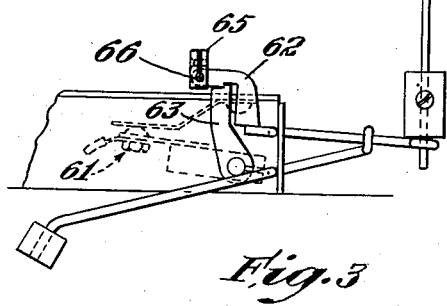
Fig. 3 is a diagrammatic view showing the switch of a winding unit and the operating connections thereto including a pivoted thread detector eye.
Figure 7:
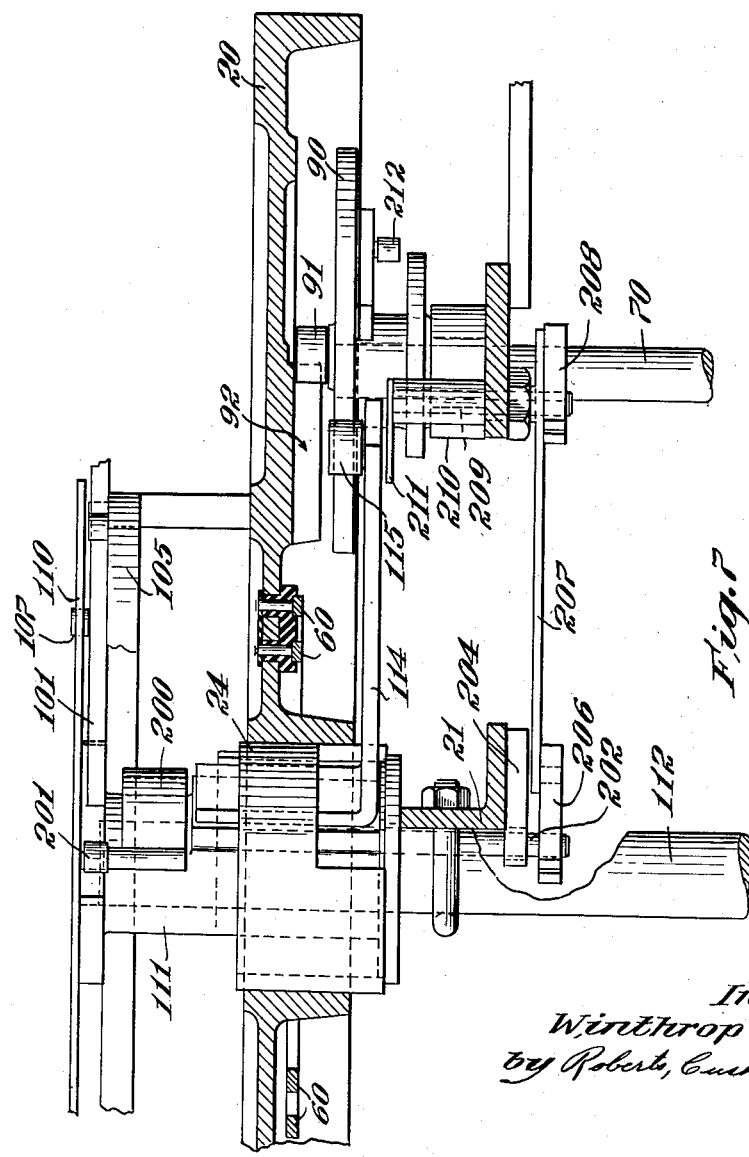
Fig. 7 is a sectional view on the line 7—7 of Fig. 6 showing the drive from the main cam shaft to the rotatable table, and the drive from the main cam shaft to the traverse control cam.

Three-phase relatively low voltage current is supplied to the winding units through two insulated slip rings 60 on the lower side of table 20, Fig. 7, and through the table and frame of the machine. The motor of each unit is electrically connected to the rings 60 through a double switch 61 (Fig. 3) yieldingly urged to open but adapted to be held closed by a latch 62 which holds a switch lever 63 in a manner similar to the latching of the corresponding switch in United States Patent No. 2,426,168.

Latch 62 can be automatically released to allow the switch to open and stop the unit's motor (a) when the bobbin has been filled to a predetermined length, (b) when the thread breaks or exhausts and the detector eye 49 rises, and (c) when the winding unit reaches a predetermined place ahead of and near the automatic bobbin-changing mechanism of the machine. Since such control of the latch and switch and motor is known and does not form part of the present invention, it will not be described here in detail except to mention that by the time a winding unit has made nearly one complete rotation with the table its bobbin will normally have been filled to the desired predetermined length and its thread guide assembly 33 will strike a projection 65 (Figs. 3 and 10) on a tiltable rod 66 that carries the latch 62, thus tilting the rod and latch and releasing the switch arm 63, allowing the switch 61 to open.

Mechanism is provided for giving the table 20 an intermittent rotary motion, bringing each winding unit in turn to a station at which certain operations are automatically performed. As applied to a table having twelve winding units, each rotation of the table is in twelve steps and in the preferred form of machine shown the rotation of the table is counterclockwise and the dwell of the table after each forward step is somewhat longer in time than the time occupied by the forward step. Thus for example the ratio between time of dwell and time of forward motion may be in the neighborhood of seven to five.

Figure 5:
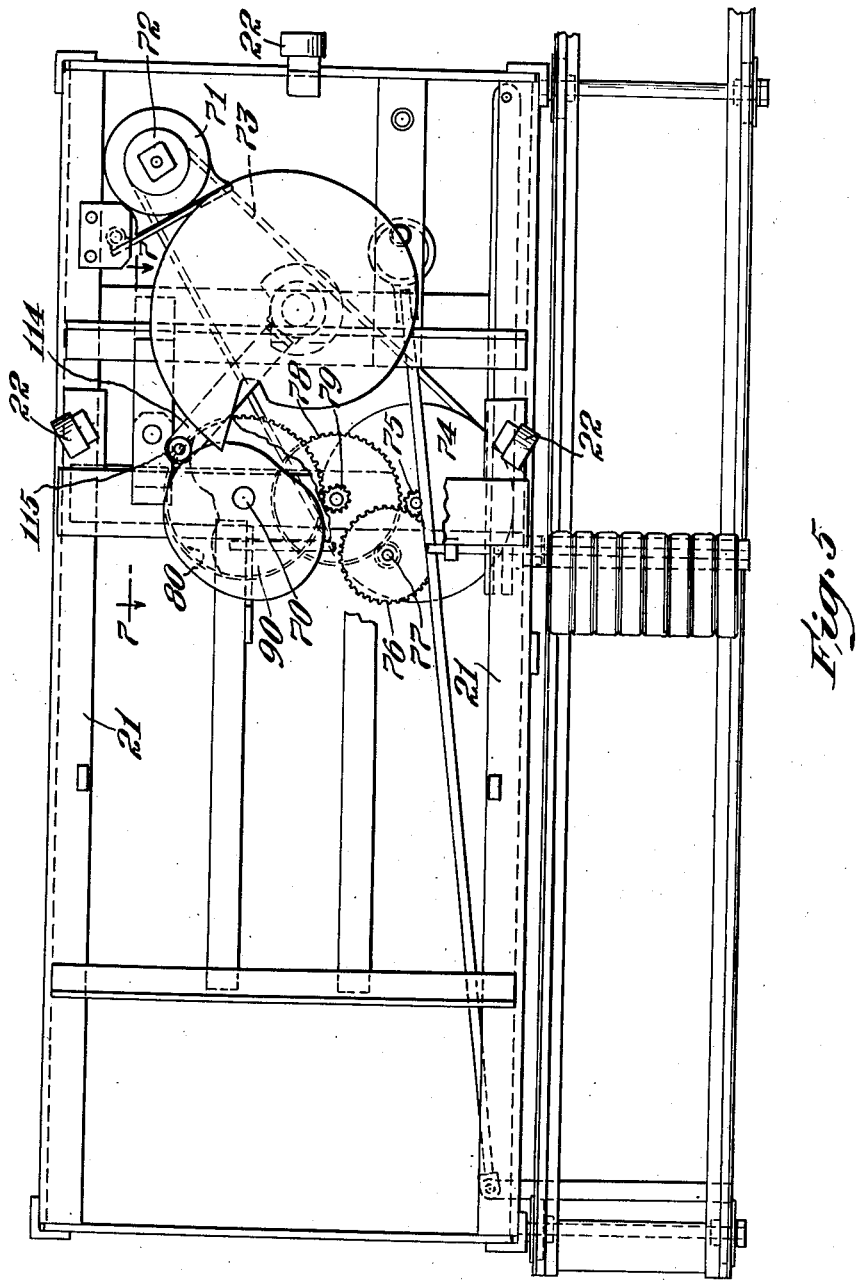
Fig. 5 is a diagrammatic plan view showing mainly driving connections from a motor to a main cam shaft, and also showing one of the cams on this main cam shaft and a connection therefrom for operating the central control cam.

A main cam shaft 70 is driven continuously from a main motor 71 (Fig. 5) through a train of reduction gearing comprising pulley 72, belt 73, pulley 74, pinion 75, gear 76, pinion 77, gear 78, pinion 79 and gear 80. For convenience, main cam shaft 70 carries a number of cams. The upper surface of the uppermost such cam 90 carries a roller 91 (Figs. 6 and 7) adapted to mesh successively with each of twelve Geneva gear slots 92 in the lower face of the table 20. Rotation of the cam shaft 70 thus rotates the table intermittently in 30° steps. As indicated above and as will be evident from the relation between the Geneva roller 91 and the Geneva gear slots 92, the ratio of time of dwell to time of motion of the table is approximately seven to five.

The Geneva type of drive, for effecting the intermittent motion of the table, is preferred because it causes the motion of the table to be a harmonic, with smooth acceleration at the start of each step and smooth deceleration in approaching the stop or dwell. The invention however is not limited to use of a Geneva type drive, and other intermittent drives, for example a ratchet drive, could be used to move the table in steps.

A lock may be provided to hold table 20 against unintended rotation during its dwells while not being driven by the Geneva gear. As diagrammatically shown in Fig. 6, a locking pin 360 may normally enter one Geneva slot 92 as the Geneva roll 91 leaves another such slot. Locking pin is carried by a crank 361 on a shaft 362 having an arm 363 which carries a cam follower roll 364 controlled by a cam 365 on cam shaft 70. Cam 365 is so timed with reference to Geneva roll 91 as to remove locking pin 360 from a Geneva slot as the Geneva roll 91 enters a Geneva slot and allow locking pin 360 to enter a Geneva slot as Geneva roll 91 leaves a Geneva slot.

Each winding unit is provided with a shiftable abutment 100 (Figs. 6, 11 and 12) adapted to fix the inward limit of the short stroke of traverse of its thread guide assembly. This abutment 100 is carried by a control rod 101 slidable in a slotted guide 102 in the top of the winding unit and is further guided between vertical rolls 104 (Fig. 2) on a central ring 105 carried by table 20. Each control rod 101 carries a cam follower roll 107, and the several such rolls engage the periphery of a central traverse control cam 110.

Control cam 110 is provided with a hub 111 and can oscillate therewith about a stationary central vertical shaft 112 (Fig. 7). A crank arm 114 on hub 111 carries a cam follower roll 115 which engages the cam 90, on the main cam shaft 70, to effect this oscillation.

The radial throw of the traverse control cam 110 represents the radial advance or progression of the zone of traverse of the thread guide of a winding unit in the cycle of winding a bobbin, and for shorter or longer lengths of bobbins, or wound thread masses on the bobbins, the traverse control cam can be replaced by another similar cam having a longer or shorter throw. Shortening of the length of the wound mass can also be secured without changing the control cam by shifting each stop element 65 inwardly along its tiltable latch-controlling rod 66, so that each unit knocks off after a shorter progression of its thread guide assembly toward the tip of the bobbin.

It will be observed that if the control cam 110 were maintained stationary, then the progression of any particular thread guide would take place only during the intervals of rotary travel of the table 20, and progression would thus be lacking in the relatively longer intervals of dwell of the table and would be too abrupt during the relatively shorter periods of rotary travel. Motion of the traverse control cam is however so related to the successive advances and dwells of the table that an approximately uniform progression of each thread guide results. Thus the traverse control cam is oscillated backward (clockwise) throughout such time as the table is stationary, and in so doing provides the desired progression of the thread guides during this interval. During movement (counterclockwise) of the table, the traverse control cam moves forwardly (counterclockwise) but at a lesser angular velocity than the table, so that the net effect of the motions of the table and cam is again a progression of the thread guides. The oscillation of the control cam has the same arc forward and backward, so that any given portion,
for instance its terminal point 110ª or its beginning point 110ᵇ, will remain within a relatively limited zone. The region of the terminal point 110ª and beginning point 110ᵇ (Fig. 6), with reference to the follower 107, corresponds to a station indicated by the center line XII—XII where a winding unit is subjected to the bobbin-changing operations.

It may also be observed that the arc of motion of the control cam 110 is less than the arc of one step of advance of the table. In addition, it may be mentioned that where the table has a harmonic motion (as in the preferred construction) the duration of backward motion of the cam overlaps somewhat the duration of forward motion of the table, and that backward motion of the cam begins while the table is decelerating to stop, persists through the stoppage or dwell, and only ends after some acceleration of the table has taken place. These factors contribute to the provision of a constant relative movement as between the cam and the table. Further, in the preferred machine shown, the control cam has an approximately constant rate of rise from its beginning point 110ᵇ to its terminal point 110ª.

The terminal point 110ª and the beginning point 110ᵇ of the control cam are separated by an inwardly extending cut-out portion 110ᶜ adapted to permit inward movement of the follower roll 107 and thread guide abutment 100 considerably beyond the positions representing the beginning of winding upon a bobbin.

Upon arrival at the station at line XII—XII a given winding unit will be in an inactive condition, with its motor deenergized (usually because its latch rod 66 has been tilted as a result of completion of winding). Upon arrival of the unit at this station a doffing lever 120 (Fig. 8) is operated through a link 121, a crank plate 122 (pivoted at 124) and cam follower 123 from a cam 125 on the main cam shaft 70, to swing inward and hold the chuck-controlling lever 31 of the unit inwardly, thus retracting the outer chuck 28, releasing the wound bobbin and preparing for reception of the new empty bobbin.

Figure 14:
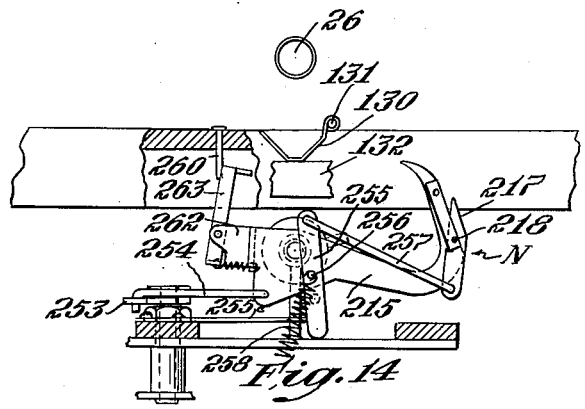
Fig. 14 is an end face view of a winding unit at the bobbin-changing position, showing the thread cutter in inactive position.

The doffed bobbin is received in a tray 130, Fig. 14, pivotally connected at 131 to the winding unit, the tray being supported in bobbin-holding position by resting upon the upper surface of a supporting ring 132.

Figure 9:
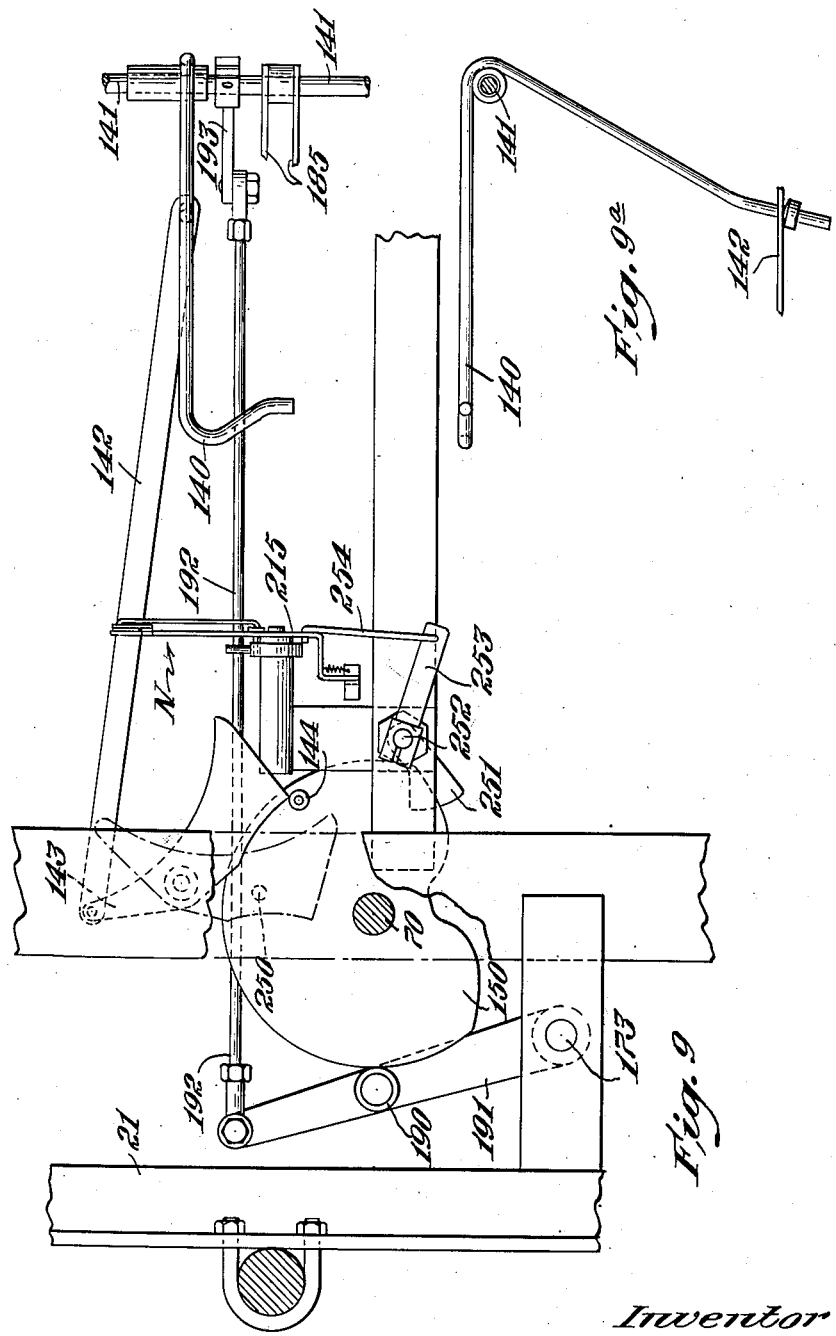
Fig. 9 is a diagrammatic view largely in plan showing drives from the main cam shaft to the thread cutter, the bobbin feeder and the bobbin depressor.

A bobbin-depressor 140 is pivoted loosely upon a shaft 141, Figs. 9 and 9ª and is swung down through the space occupied by a bobbin, between the chucks, so as to remove forcibly any bobbin that fails to drop out from between the chucks. The bobbin-depressor in most cases does not encounter a bobbin between the chucks, but is useful as a precaution. Further, the bobbin-depressor then prevents the bobbin from being lifted by the pull of the thread extending thereto while the thread guide is shifted away from the tip of the bobbin as subsequently described. The bobbin depressor is raised from its normal, lower position, raised up to permit the bobbin of the winding unit to come beneath it, and is then lowered to its lower position by linkage (Fig. 9) including a link 142, a cam-follower lever 143 and an actuating roller 144 on the upper surface of a cam 150, subsequently referred to, on the main cam shaft 70.

Figure 10:
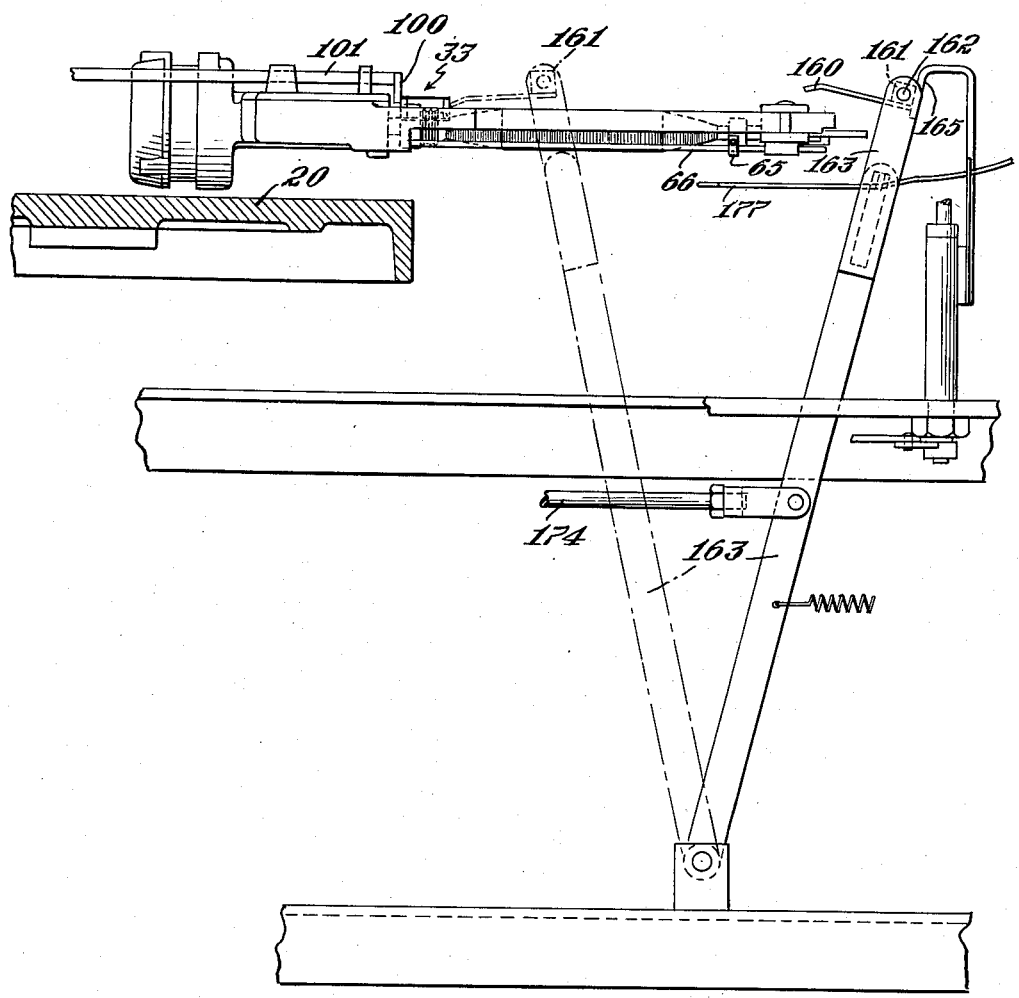
Fig. 10 is a side elevation of a portion of the winding unit and the thread guide positioning member.
Figure 11:
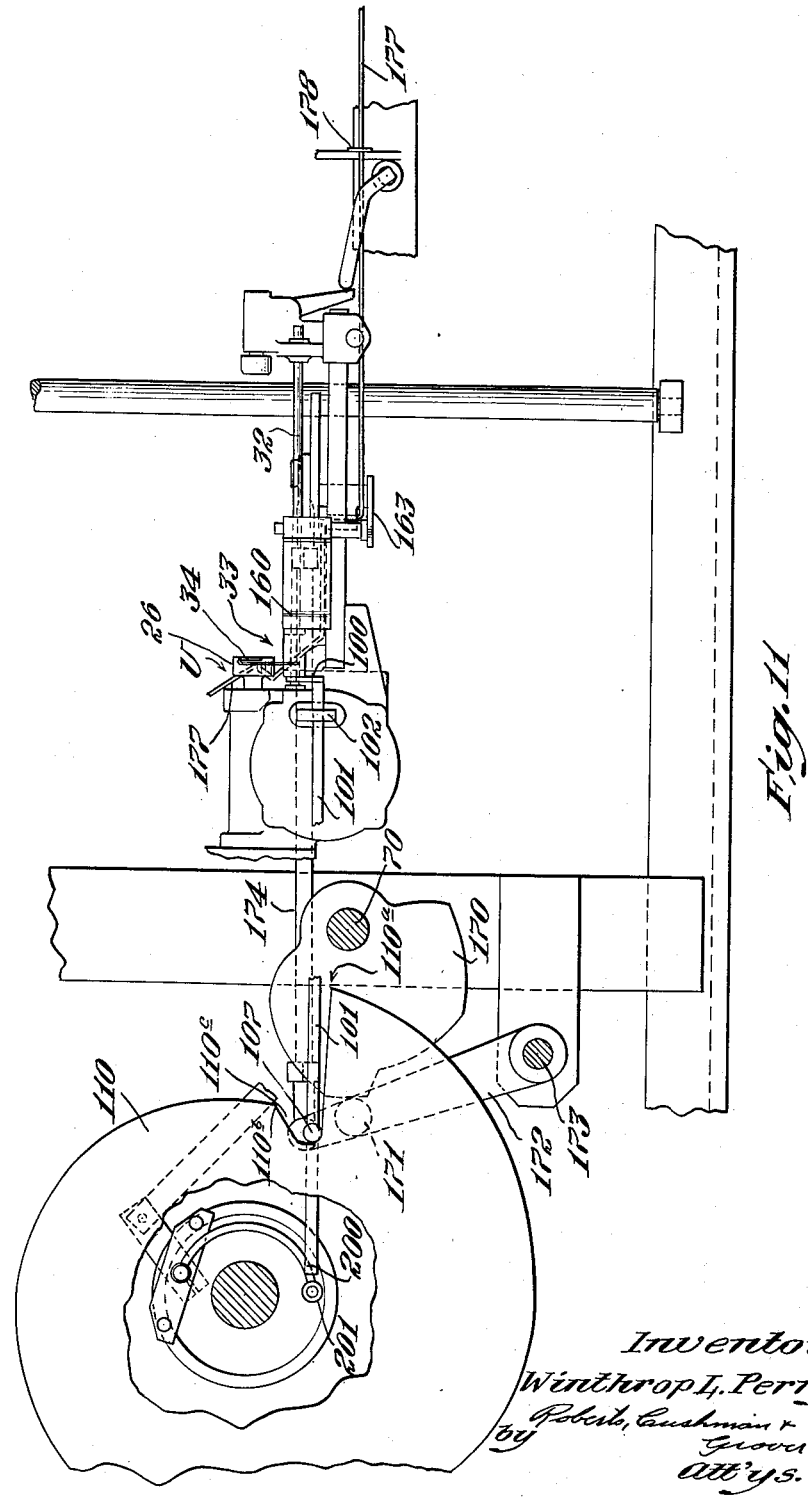
Fig. 11 is a diagrammatic view largely in plan showing the drive from the main cam shaft to the thread guide pusher, and also showing the thread guide pusher at its extreme inner position and showing the winding unit in condition to receive an empty winding bobbin.

A thread guide positioning member 160 is provided with a squared hub 161 which is bored to pivot upon a rod 162 extending from an arm 163, Figs. 1, 10 and 11. The thread guide positioning member 160, in its inactive position rests with its squared hub 161 against a stationary inclined stop 165, which serves to hold the thread guide positioning member clear of the winding unit, but upon inward movement drops slightly and slides with its downturned inner end upon the horizontal frame element of the winding unit.

As shown in Figs. 11 and 10 the driving connections to the thread-positioning member include a cam 170 on main cam shaft 70, a cam follower 171, rocker arm 172 pivoted at 173 and a link 174 connecting the rocker arm 172 and the pivoted arm 163.

Inward movement brings the thread guide positioning member 160 into contact with the thread guide assembly 33 and pushes the thread guide assembly inwardly until the thread guide 34 is somewhat beyond the inner or base chuck 26, as in Fig. 11. At this position of the winding unit the cam follower roll 107 of the winding unit is at the cut-out portion 110$^c$ of the central traverse control cam 110, and inward movement of the thread guide assembly by the thread guide positioning member 160 moves the cam follower 107 into this cut-out portion. The cut-out portion is of sufficient width so that the cam 110 can oscillate backwardly (clockwise) while the cam follower 107 is in the cut-out portion, at a smaller radius than the beginning point 110$^b$ of the cam.

At the time of inward movement of the thread guide assembly as described above, a bent wire 177 guided in a support 178 is moved inward at a level below the level of the chucks, and engages the thread between the thread guide and discharged bobbin and forces the thread against the base chuck 26. Wire 177 is connected to partake of the back and forth movement of the arm 163 carrying the thread guide controlling member 160, and the shape of wire 177, as viewed in elevation (Fig. 1), is such that its inner end follows an approximately horizontal path. As shown in Fig. 11 the innermost position of wire 177 carries its inner end beneath the base chuck 26.

The machine includes a bobbin magazine indicated generally at M which will not be described in detail because it may be of any desired construction but is preferably similar to that of United States Patent No. 2,377,367. The magazine operates automatically to supply a single file of bobbins suspended by their enlarged base portions between two parallel plates, the nearer one of which is shown at 180 in Fig. 1, the upper edges of these plates being inclined downwardly toward the winding unit. The bobbins are released one at a time from between these plates by any suitable release mechanism, for example swinging finger release mechanism similar to that of United States Patent No. 2,395,028.

A swinging bobbin-positioning member includes parallel bars 185 (Figs. 1 and 9) fast on shaft 141 and spaced so that the shank of a bobbin can pass between them, and pairs of spaced resilient fingers 186 and 187 adapted yieldingly to retain a bobbin below the bars 185. In its raised position of Fig. 1, the bobbin-positioning member receives a bobbin from the plates 180 and holds the bobbin between its fingers 186, 186 and 187, 187.

The bobbin-positioning member is swung down to a horizontal position where the bobbin held by its fingers lies between the chucks of the winding unit. Mechanism for moving the bobbin-positioning member includes the cam 150, previously mentioned, Fig. 9, a cam follower 190, rocker arm 191, link 192 and crank 193 on shaft 141.

With the bobbin positioned horizontally between the chucks of the winding unit, the cam 125 (Fig. 8), operates to allow the doffing lever 120 to release the chuck-controlling lever 31 of the winding unit, allowing the outer chuck 28 to spring inwardly, grasp the tip of the new bobbin and force the bobbin into the inner or base chuck 26, clamping against this chuck the run of thread that has previously been positioned across the chuck by the thread guide 34 and wire 177.

Thereupon the bobbin-positioning member 185, 185 is swung upwardly to its bobbin-receiving position of Fig. 1 and in so moving, its fingers slip past the empty bobbin, leaving the empty bobbin held between the chucks of the winding unit.

The cam 170 which controls the thread guide positioning member 160 then acts to cause this member to retract outwardly to the position of Fig. 12, to permit subsequent movement of the thread guide within a restricted zone $b$ of for example 5/8" length along the shank of the bobbin, to build a starting or base bunch. A cam follower return lever 200, through a roller 201 at its outer end, acts on the end of abutment control rod 101 to force this rod outwardly sufficiently to bring the cam follower roll 107 into position to be received by the beginning point 110$^b$ of cam 110, and this movement of rod 101 carries the abutment 100 into position to define the inner end of the restricted zone $b$ of traverse for building the bunch.

Cam follower return lever 200 is of curved form, as viewed in plan, to extend partly around the stationary shaft 142 of cam 110 and is fast upon a vertical shaft 202 which as best shown in Fig. 13 passes through a bearing in a plate 203 on the top of stationary sleeve 24 and thence down inside sleeve 24, and as shown in Fig. 13 thence through a bearing in a stationary plate 204. Shaft 202 is swung about its axis by driving connections (Figs. 7 and 12) including a crank 206, link 207, crank 208, vertical shaft 209 mounted in a bearing 210, and cam follower lever 211 which is engaged by a pin 212 extending down from the lower surface of the previously mentioned cam 90.

With the winding unit not quite yet energized to start winding again, a thread cutter indicated generally at N is actuated to cut the thread between the base chuck and the discharged bobbin in tray 130.

Thread cutter N (Figs. 9 and 14–16) comprises generally a swinging arm 215 carrying a fixed blade portion 216 to which a movable blade 217 is pivoted at 218. With the movable blade open, the swinging arm and movable blade together swing counterclockwise into position to intercept the thread between the fixed blade portion and movable blade, whereupon blade-closing linkage causes the movable blade to close and sever the thread. At near the end of the return movement of the cutter, linkage opens the movable blade.

The cutter is swung by linkage, Fig. 9, including a pin 250 extending down from the lower surface of the previously mentioned cam 150, a crank 251 on shaft 252, crank 253, and link 254 connected to the swinging arm 215 of the cutter (Figs. 9 and 14). The pin 250 striking the crank 251, once each cycle, operates the cutter.

The swinging arm 215 carries a lever 255 pivoted thereto on a pin 256, one end of lever 255 being connected to the movable blade by a link 257. The cutter is normally held in its position of Fig. 14 by a spring 258.

Figure 15:
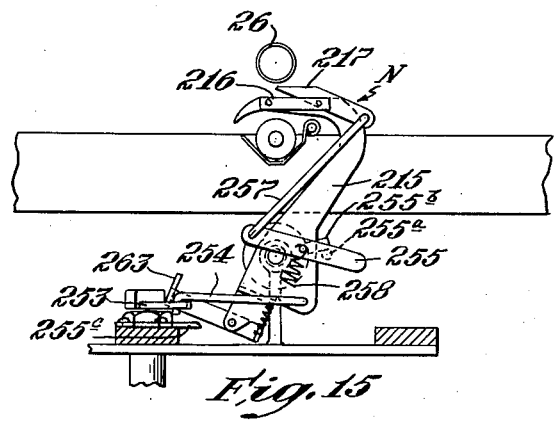
Fig. 15 is a view similar to Fig. 14 but showing the thread cutter in its active position.
Figure 16:
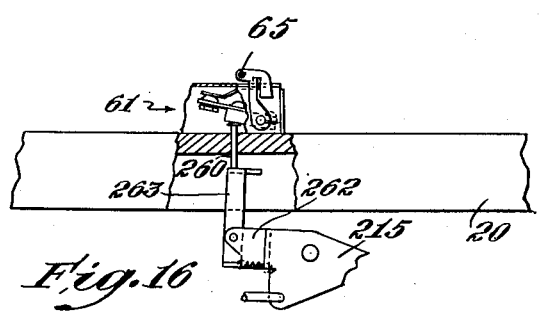
Fig. 16 is a fragmentary detail view showing the thread cutter returned to its inactive position and having closed the switch of the winding unit.

As the cutter swings up toward its cutting position, the movable blade 217 remains open until the position of Fig. 15 is reached, whereupon a pin 255ª on lever 255 strikes a stationary stop pin 255ᵇ (Fig. 15). The slight further swinging motion of the cutter as a whole, while lever 255 is restrained by the pin 255b, acts through lever 255 and link 257 to close the movable blade. This cuts the thread extending from the supply to the full bobbin in the tray 130. On return movement of the cutter, the lever 255 strikes a stationary stop element 255c (Fig. 14) which acts on the lever 255 to open the movable blade.

The return motion of the cutter is availed of to start the winding unit by closing its switch 61. The switch 61 has beneath it a pin 260 extending down through a hole in the table 20, so that pressing upwardly on the pin will tilt the switch to closed position. Swinging arm 215 of the cutter carries an arm 262 having a spring-held pivoted extension 263 adapted to be deflected in the direction of travel by a pin 260 of a winding unit, as in Fig. 14. As the cutter swings to cut, the extension 263 swings back and stops against the arm 262. Then when the arm 262 and extension 263 rise on the return movement of the cutter, extension 263 underlies the pin 260 and rises and lifts the pin as in Fig. 16, closing the switch 61. The switch is latched closed by the latch previously described, unless the thread detector prevents such latching as in the case of absence of thread at the detector.

After the requisite number of turns have been wound to provide the wound bunch near the base of the bobbin, the thread guide positioning member is automatically retracted and returned to its inactive raised position of Fig. 10. Shortly thereafter, the rotary motion of the table 20 begins again. The cam follower 107 engages the operative surface of the cam at its beginning point 110ᵇ and the abutment 100 is controlled by the composite action of oscillation of cam 110 and intermittent motion of the table 20, as above described.

When a winding unit reaches the end of ring 132 its tray 130 tilts down, discharging the bobbin onto a platform 270 and inside of a forked member 271 which is pivoted at 272 to swing horizontally. The undersurface of table 20 is provided with a series of pins 275, one for each winding unit, each of which engages the forked member 271 as in Fig. 17 and swings it and the bobbin therein out beyond the edge of platform 270.

A bobbin-collecting tray 280 having compartments $B_1$ $B_2$, etc., Fig. 22, for eight bobbins side by side, is reciprocable to bring each compartment into position to receive a bobbin delivered from the edge of platform 1.

As shown in Figs. 20 to 22 the compartments $B_1$ to $B_8$ of tray 280 are mounted on a bar 282 carried by an arm 283 fast on a shaft 284 which is rotatable and slidable in a bushing 286 (Fig. 22). Reciprocation of shaft 284 and tray 280 is accomplished by a swinging motion of lever 290, Figs. 17 and 22, having an open forked end adapted to engage a pin 291 on the shaft 284. Throughout substantially all of its reciprocating movement the tray 280 is steadied against rotation by engagement of a lug 292 with a guide bar 293 on the frame. In reaching its outermost position of Fig. 22 the lug 292 leaves the guide bar 293 but enters within the forked upper end of a bell crank 295 which pivots about the bushing 286. Pivoting of bell crank 295 from the position of Fig. 20 to the position of Fig. 21 tilts the tray 280 to a position to discharge its group of bobbins onto a row of pins 300 of a pinboard indicated generally by P.

A pivoted wire yoke 305 normally extends around the open right end of tray 280, being supported in this position by a spring 306 at the inner side of the tray, Fig. 20, the yoke preventing the bobbins from sliding prematurely off the tray. Near the fully tilted position of the tray, Fig. 21, the inner portion of the wire yoke 305 strikes a stationary pin 307 which forces the yoke out of the way of the downwardly tilted end of the tray, permitting the group of bobbins to drop onto the pins 300.

Figure 19:
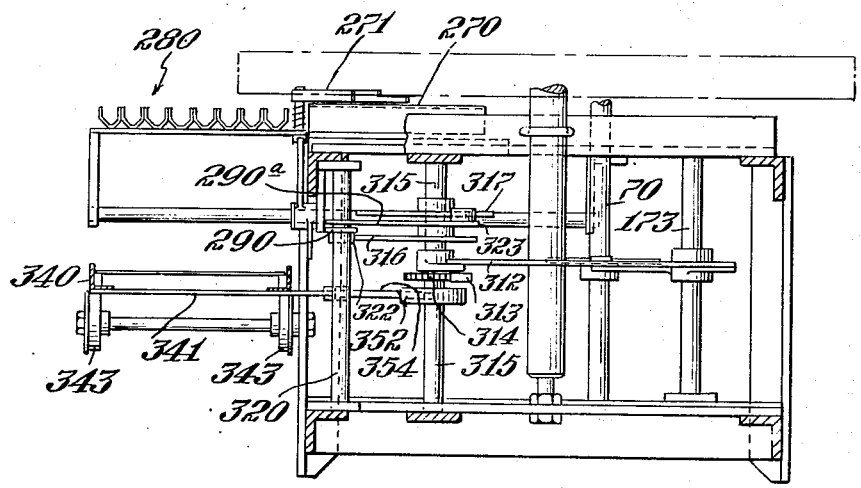
Fig. 19 is a view similar to Fig. 18 excepting that certain parts have been omitted to expose other parts to view.

Mechanism for swinging the forked lever 290 to reciprocate the tray 280 is shown as including a cam 310 on main cam shaft 20 a bell crank 311 on shaft 173, a link 312, pawl 313, a ratchet wheel 314, shaft 315, and a double cam 316, 317 fast on shaft 315 and turned slowly by the ratchet wheel. The forked lever 290 is pivoted at 320, Fig. 17, and has secured thereto a crank arm 290ª, the lever 290 and its crank arm 290ª carrying followers 322 and 323 which engage the cams 316 and 317 respectively. The shape and timing of cams 316 and 317 are such that, starting with the tray in its outermost position of Figs. 19 and 22 alternate compartments of the tray are successively placed at bobbin-receiving position by the inward part of the movement of the tray and other compartments are successively placed at bobbin-receiving position by the outward part of the movement of the tray. For example, compartments $B_2$, $B_4$, $B_6$ and $B_8$ are successively placed at bobbin-receiving position by inward movement of the tray, and the compartments $B_7$, $B_5$, $B_3$ and $B_1$ are successively placed in bobbin-receiving position by outward movement of the tray. Following the positioning of compartment $B_1$ in bobbin-receiving position, and after allowing time for reception of a bobbin thereby, the tray is further shifted outward to the position of Figs. 19 and 22, so that it can be tilted to discharge its group of bobbins.

Figure 17:
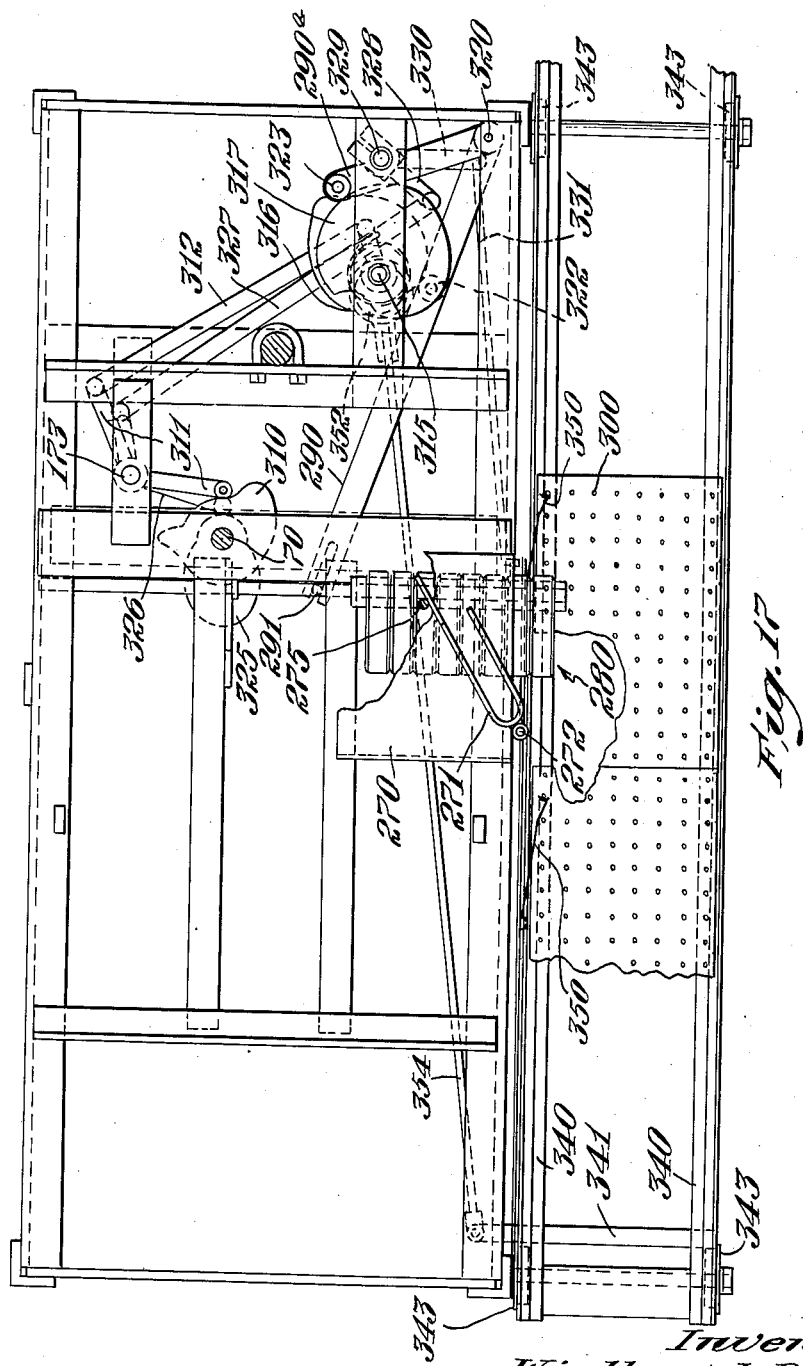
Fig. 17 is a view in the nature of a plan, with many parts omitted, showing the various driving connections to the pinboard mechanism.
Figure 18:
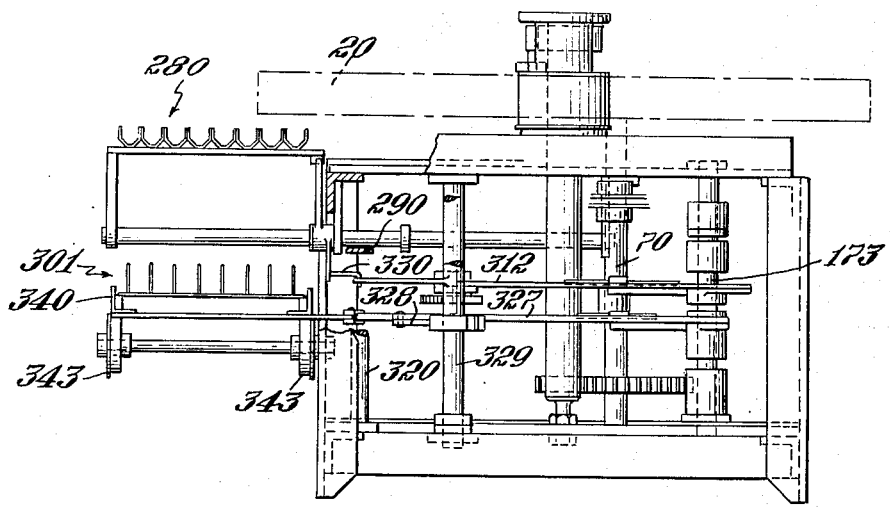
Fig. 18 is an elevation taken from the right of Fig. 17.

Mechanism for swinging the bell crank 295 to tilt the tray 280 is shown as including a cam 325 on the main cam shaft 70 (Fig. 17), a bell crank 326 rotatable upon rocker arm shaft 173, a link 327, crank arm 328, vertical shaft 329, crank arm 330 and link 331 (Figs. 17 and 20). Bell crank 295 is thus tilted from its vertical position of Fig. 20 to its inclined position of Fig. 20 at each revolution of the main cam shaft, but this motion is an idle motion except once every eighth cycle, when the tray having received eight bobbins is in the position of Fig. 22 with its lug 292 in engagement with the bell crank. Upon such eighth cycle, the tray 80 is tilted as in Fig. 21 to discharge the bobbins.

The pinboards, both before and after filling, rest upon a pair of guide rails 340 and are advanced step by step to and past the filling position by reciprocation of these rails combined with detent action restraining the pinboards from backward movement.

Guide rails 340 are interconnected by cross pieces one of which is shown at 341 (Fig. 17) to form a rigid reciprocable frame, and rest upon rollers 343.

During the course of filling the tray 280 with eight bobbins, the guide rails 340 are shifted to the right somewhat more than the distance between adjacent rows of pins on a pinboard, for example two inches where the rows are one and one-half inches apart, and also are shifted backwardly the same amount. The pinboard or pinboards on rails advance to the right with the rails, and in this advance to the right, pins on the pinboards can deflect and pass by flexible wire detents 350. Upon the left or return stroke of the rails, the detent wires check the motion of the pinboard or pinboards, so that a row of empty pins is stopped in position to receive its group of bobbins from the tray 280.

The reciprocation of the rails may be, for example, by means of an eccentric 352 on shaft 315 and connected to the cross piece 341 by link 354.

It will be observed that many of the motions of parts of the machine are initiated and controlled by cams or rollers or pins, traveling in a rotary path, with which a follower such as a crank or rocker arm or lever cooperates. To simplify the illustration, the various springs which restore such followers and the parts they actuate, or cause the followers to follow a drop in the respective cam, are generally omitted in the drawings.

I claim:

1. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and a drive for the cam moving it backwardly opposite to the direction of travel of the units during periods of stoppage of the rotary movement of the units.

2. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and mechanism for imparting to the cam a variable movement so related to the intermittent movement of the units as to approximately equalize the rate of relative movement between the units and the cam during travel and stoppage of the units.

3. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and a drive for the cam moving it backwardly opposite to the direction of travel of the units during periods of stoppage of the rotary movement of the units, such backward movement of the cam during a period of stoppage being through a lesser arc than one angular step of advance of the units.

4. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, said cam having a substantially uniform rise from its beginning point to its terminal point, and a drive for the cam moving it backwardly opposite to the direction of travel of the units during periods of stoppage of the rotary movement of the units.

5. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and an intermittent drive for the cam imparting backward steps of motion thereto, the periods of stoppage of the units occurring during such backward steps.

6. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and mechanism oscillating the cam forwardly and backwardly in timed relation to the stopping and starting of rotary movement of the units, the periods of stoppage of the units occurring during the backward strokes of oscillation of the cam.

7. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and mechanism arranged to move the cam backwardly opposite to the direction of travel of the units during periods of stoppage of the rotary movement of the units, and to move the cam forwardly but at a lesser rate of advance than the units during periods of travel of the units, so as to provide a net relative advance of the units relative to the cam during travel of the units.

8. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and mechanism arranged to move the cam backwardly opposite to the direction of travel of the units during periods of stoppage of the rotary movement of the units, and to move the cam forwardly but at a lesser rate of advance than the units during periods of travel of the units, so as to provide a net relative advance of the units relative to the cam during travel of the units, the intermittent rotary movement of the units having progressive acceleration following the stop and progressive deceleration approaching the stop, and the backward movement of the cam taking place throughout the period of stoppage and during portions at least of said acceleration and deceleration.

9. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and mechanism arranged to move the cam backwardly opposite to the direction of travel of the units during periods of stoppage of the rotary movement of the units, and to move the cam forwardly but at a lesser rate of advance than the units during periods of travel of the units, so as to provide a net relative advance of the units relative to the cam during travel of the units, the intermittent rotary movement of the units being approximately harmonic, and the backward movement of the cam overlapping the beginning and ending of the period of the rotary movement.

10. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and mechanism oscillating the cam forwardly and backwardly in timed relation to the stopping and starting of rotary movement of the units, the periods of stoppage of the units occurring during the backward strokes of oscillation of the cam, and the angular stroke of oscillation of the cam being materially less than one step of angular movement of the units, so that the relative movement between the units and the cam is in the same relative sense during both stoppage and movement of the units.

11. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and mechanism oscillating the cam forwardly and backwardly in timed relation to the stoppaging and starting of rotary movement of the units, the periods of stoppage of the units occurring during the backward strokes of oscillation of the cam, and the forward and backward strokes of oscillation of the cam being of substantially equal length.

12. A multiple-unit winding machine including a plurality of winding units of the type having a traversing thread guide having a zone of traverse adapted to progress during the winding, mechanism for imparting an intermittent rotary movement to said winding units, a cam common to the several units for determining the progression of their zones of traverse, and mechanism oscillating the cam forwardly and backwardly in timed relation to the stopping and starting of rotary movement of the units, the periods of stoppage of the units occurring during the backward strokes of oscillation of the cam, the machine including thread guide restoring mechanism not partaking of the rotary movement of the units, and the cam having a gap between its terminal point and its beginning point, said gap oscillating in the region of action of the thread guide restoring mechanism.

13. A multiple-unit winding machine including a plurality of winding units each including means for holding a winding bobbin, each winding unit being of the type having a traversing thread guide having a zone of traverse adapted to progress during the winding, mechanism for imparting an intermittent rotary movement to said winding units so as to cause each unit to dwell at successive points in its rotary course of travel, and mechanism for restoring a thread guide to a position adjacent to the position to be occupied by the base of a new winding bobbin, said thread guide restoring mechanism operating upon successive winding units at one such point of dwell, and the machine being arranged for winding to continue on the units at a plurailty of other such points of dwell.

14. A multiple-unit winding machine including a plurailty of winding units each including means for holding a winding bobbin, each winding unit being of the type having a traversing thread guide having a zone of traverse adapted to progress during the winding, mechanism for imparting an intermittent rotary movement to said winding units so as to cause each unit to dwell at successive points in its rotary course of travel, mechanism for restoring a thread guide to a position adjacent to the position to be occupied by the base of a new winding bobbin, and mechanism for supplying such new bobbin to said holding means, said thread guide restoring mechanism and said bobbin-supplying mechanisms operating upon successive winding units at one such point of dwell, and the machine being arranged for winding to continue on the units at a plurality of other such points of dwell.

15. A multiple-unit winding machine including a plurality of winding units each including means for holding a winding bobbin, each winding unit being of the type having a traversing thread guide having a zone of traverse adapted to progress during the winding, mechanism for imparting an intermittent rotary movement to said winding units so as to cause each unit to dwell at successive points in its rotary course of travel, mechanism for discharging a bobbin from its holding means, mechanism for restoring a thread guide to a position adjacent to the position to be occupied by the base of a new winding bobbin, and mechanism for supplying such new bobbin to said holding means, said bobbin-discharging mechanism, said thread guide restoring mechanism and said bobbin-supplying mechanism operating upon successive winding units at one such point of dwell, and the machine being arranged for winding to continue on the units at a plurality of other such points of dwell.

WINTHROP L. PERRY.

References Cited in the file of this patent
UNITED STATES PATENTS

| Number | Name | Date |
|---|---|---|
| 2,163,578 | Baker | June 27, 1939 |
| 2,362,455 | Abbott | Nov. 14, 1944 |